US010699041B2

(12) United States Patent
Hammerschmidt

(10) Patent No.: US 10,699,041 B2
(45) Date of Patent: Jun. 30, 2020

(54) AGE ESTIMATOR FOR SAFETY MONITORING BASED ON LOCAL DETECTORS

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/415,107

(22) Filed: May 17, 2019

(65) Prior Publication Data

US 2019/0278881 A1 Sep. 12, 2019

Related U.S. Application Data

(63) Continuation of application No. 14/488,639, filed on Sep. 17, 2014, now Pat. No. 10,296,670.

(51) Int. Cl.
*G06F 30/20* (2020.01)
*G06F 30/30* (2020.01)
*G06F 30/333* (2020.01)
*G06F 119/04* (2020.01)

(52) U.S. Cl.
CPC .............. *G06F 30/20* (2020.01); *G06F 30/30* (2020.01); *G06F 30/333* (2020.01); *G06F 2119/04* (2020.01)

(58) Field of Classification Search
None
See application file for complete search history.

(56) References Cited

U.S. PATENT DOCUMENTS

| 6,690,569 B1 | 2/2004 | Mayer et al. |
| 7,200,524 B2 | 4/2007 | Kang et al. |
| 2003/0078741 A1 | 4/2003 | Storino |
| 2006/0267621 A1 | 11/2006 | Harris et al. |

FOREIGN PATENT DOCUMENTS

| DE | 4305172 A1 | 8/1994 |
| DE | 102011085251 A1 | 5/2013 |

OTHER PUBLICATIONS

Non-Final Office Action dated Oct. 12, 2017 in connection with U.S. Appl. No. 14/488,639.
Final Office Action dated Apr. 16, 2018 in connection with U.S. Appl. No. 14/488,639.
Non-Final Office Action dated Sep. 14, 2018 in connection with U.S. Appl. No. 14/488,639.
Notice of Allowance dated Jan. 28, 2019 in connection with U.S. Appl. No. 14/488,639.

*Primary Examiner* — Syed A Roni
(74) *Attorney, Agent, or Firm* — Eschweiler & Potashnik, LLC

(57) ABSTRACT

An age monitoring arrangement includes a sensor, a calculation component, and a timer. The sensor is configured to generate one or more measurements of an environmental property. The calculation component is configured to generate a virtual age and identify an occurrence of an event based on the one or more measurements and a clock using an aging module. The timer is configured to generate the clock.

18 Claims, 5 Drawing Sheets

AGE ESTIMATOR FOR SAFETY MONITORING BASED ON LOCAL DETECTORS

CROSS REFERENCE TO RELATED APPLICATIONS

This application is a continuation of U.S. application Ser. No. 14/488,639 filed on Sep. 17, 2014, the contents of which are incorporated by reference in their entirety.

BACKGROUND

Devices are designed to operate in a wide variety of environmental conditions. These conditions can include temperature ranges, UV exposure, humidity, pressure, and the like. The conditions upon which the device is designed are referred to as expected operating conditions or mission profiles.

The design process considers the mission profiles when selecting materials, components, fabrication procedures, and the like. Then, qualification testing is done on prototype devices to determine if the designed devices meet the mission profiles.

Once in use, the devices encounter conditions that may or may not be conditions expected from the mission profile. Devices may have faults or fail prematurely due to manufacturing errors, design errors, unexpected operating conditions, misuse, and the like. It may be difficult to determine the cause of the premature failure. Additionally, if the cause of the failure is not known, corrective action cannot be taken.

DETAILED DESCRIPTION

Figure 1:
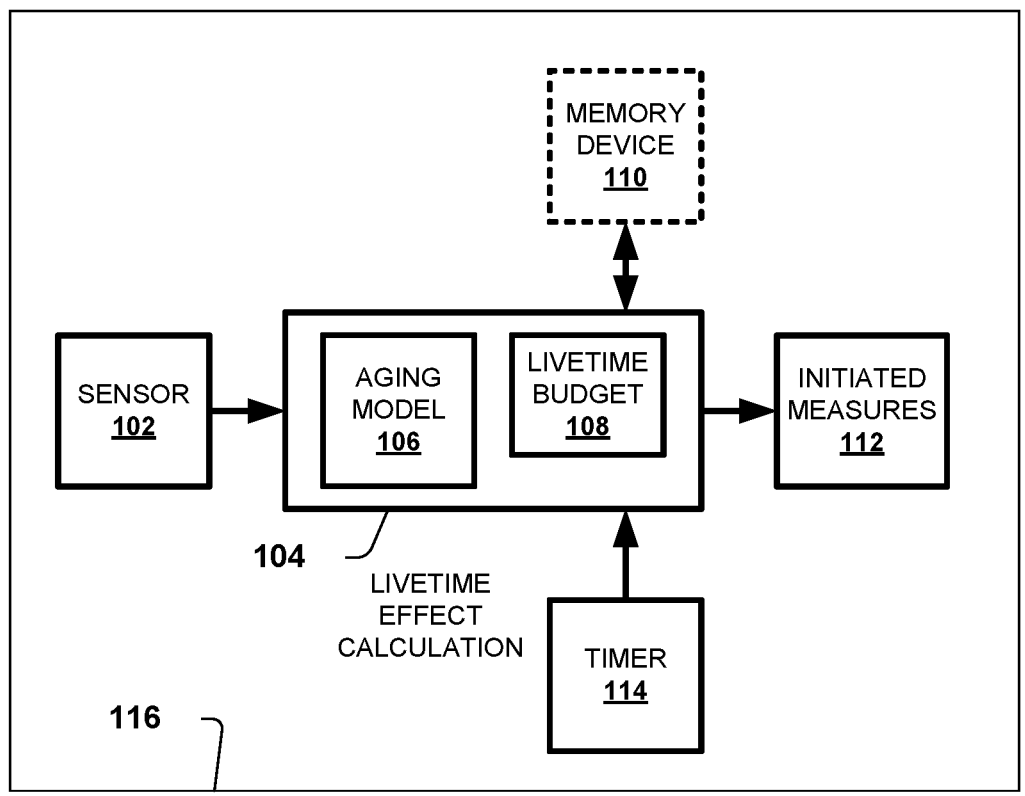
FIG. 1 is a block diagram of a virtual age monitoring system.

The present invention will now be described with reference to the attached drawing figures, wherein like reference numerals are used to refer to like elements throughout, and wherein the illustrated structures and devices are not necessarily drawn to scale.

Devices, systems and methods are disclosed that estimate a virtual age for safety monitoring. The virtual age is determined by measuring environmental properties and using aging models. As a result, remaining lifetimes, use conditions, and the like can be provided and, optionally, used to compensate or correct of potential faults.

FIG. 1 is a block diagram of a virtual age monitoring system 100. The system 100 is provided in a simplified format to aid in understanding. The system 100 can be utilized in automotive systems, vehicle systems, and the like and determines a virtual age for a main component 116. The system 100 can be fabricated into one or more devices or components. In this example, the system 100 is described as being incorporated within the main component 116.

The main component 116 can be a device or technology part, such as digital complimentary metal-oxide semiconductor (CMOS), analog CMOS, sensors, bipolar sensors, flash components, and the like.

The system 100 includes a sensor 102, a livetime calculation component 104, a memory device 110, an initiated measured component 112, and a timer 114. The sensor 102 measures one or more environmental properties, such as temperature, magnetic field, electric field, pressure, radiation, vibration, voltage, electrostatic discharge (ESD), electromagnetic interference (EMI), and the like. The sensor 102 includes one or more sensor elements configured to measure the properties. The elements can measure the same property or varied properties. Additionally, the sensor 102 typically utilizes an interface for communication and receiving power, such as a two line interface used in automotive electronics systems. However, it is appreciated that other suitable techniques of receiving power and communicating can be used. Further, the sensor 102 provides the measurements in analog or digital format.

The timer 114 provides one or more clocks that can be used for measuring time and/or operating time. The operating time is also referred to as use time. The timer 114 can utilize components such as counters, resonators, and the like to generate the one or more clocks. The timer 114 can have a reserve or backup battery configured to provide power in case of loss of a power source. In one example, the timer 114 generates an operating clock only when the main component 106 is operating, such as when the power source is present. In another example, the timer 114 also generates an actual clock that can measure or indicate elapsed time, whether the main component is operating or not. Furthermore different timers with different time resolutions for the operation time and the non operating time may be used.

The memory device 110 is used to store device information for the main component 116. The device information includes, for example, operating life, environmental properties, operating use, duration, virtual age and the like. The operating life provides a measure of time of use, as opposed to age of the component. The environmental properties include, for example, expected temperature ranges, pressure ranges, radiation levels, and the like. The operating use or operating age is the amount of time the component has operated. The duration can be the amount of elapsed time since the component has been first activated. The virtual age is calculated as an amount of time considering accelerated aging due to environmental properties, such as relatively high temperatures. The virtual age can be varied from the operating use/age. For example, if the environmental properties exceed a mission profile, the virtual age is typically greater than the operating use/age. However, if the environmental properties are below the mission profile, the virtual age is typically less than the operating use/age.

The livetime calculation component 104 determines a livetime use time and/or the virtual age based on sensor measurements from the sensor 102 and the one or more clocks from the timer 114. The calculation component 104 also determines a remaining livetime for the main component 106. The calculation component 104 uses an aging model 106 to convert a use time into a virtual use time. The use time includes an amount of time operated under measured conditions. The virtual use time includes an amount of virtual time operated under measured conditions. For example, the use time includes a duration of 30 seconds under the measured conditions. The virtual use time is determined to be 45 seconds based on the use time and the measured conditions using the aging model 106. The virtual use time is collected by the calculation component 104 to determine an elapsed virtual use, which can be stored in the memory device 110. In one example, the calculation component 104 obtains a previous elapsed virtual use time from the memory device 110 and adds the virtual use time to the previous elapsed virtual use time to determine an updated elapsed virtual use.

The calculation component 104 also includes a livetime budget 108. This can be a static value or dynamically updated value. The livetime budget 108 includes or specifies a period of time at which the component should operate for given operating conditions, as specified in a mission profile. The calculation component 104 uses the livetime budget 108 to determine the remaining livetime. Thus, for example, the remaining livetime can be determined by subtracting the elapsed virtual use from the livetime budget 108.

The livetime budget 108 can be determined using one or more suitable techniques. In one example, the livetime budget 108 is determined during design of the main component. In another example, the livetime budget 108 is determined by qualifying prototypes of the main component.

The calculation component 104 uses the memory device 110 to store and retrieve values main component information including, but not limited to, the livetime budget 108, the livetime use, the virtual age, the remaining livetime, the use time, the virtual use time, the elapsed virtual use time, the previous elapsed virtual use time, and the like. The component 104 can use the memory device 110 via an interface or other suitable connection.

The calculation component 104 signals the initiated measures component 112 to trigger an action or event in response to main component information. The triggers can include exceeding the remaining livetime, measured environmental parameters or properties that exceed a range or the mission profile, an event, a fault or expected fault conditions, and the like.

The initiated measures component 112 causes the triggered actions to occur in response to the signals from the calculation component. The events include, for example, reporting out information, shutting down the main component, reporting out fault conditions, reporting out parameters that exceed the mission profile, and the like.

As stated above, the calculation component 104 uses the aging model 106 to determine the virtual use time or age based upon the sensor measurements from the sensor 102 and the clocks or time information from the timer 114. A variety of suitable models can be used. An example of a suitable model that can be used for the aging model 106 is described below.

The Arrhenius' equation is one example of a suitable model that can be used for the aging model 106. Only a brief description of the equation is provided.

An equation used to calculate thermal acceleration factors for semiconductor device time-to-failure distributions:

$$A_T = \exp[(-E_{aa}/k)(1/T_1 - 1/T_2)]$$

where:
$A_T$ is the acceleration factor due to changes in temperature;
$E_{aa}$ is the apparent activation energy (eV);
k is Boltzmann's constant ($8.62 \times 10^{-5}$ eV/K);
$T_1$ is the absolute temperature of the test (K);
$T_2$ is the absolute temperature of the system (K).

NOTE 1 The original Arrhenius equation (for atomic or molecular processes and chemical reactions) used the gas constant, not an activation energy, in the exponent. The "Arrhenius equation (for reliability)", used to calculate a thermal acceleration factor for a given observed time-to-failure distribution and $E_{aa}$, is in the form of the quotient of two Arrhenius equations, so that the acceleration factor for two different temperatures can be calculated.

NOTE 2 $\lambda_s = \lambda_t \cdot A_T$, where $\lambda_s$ is the quoted (predicted) system failure rate at some system temperature $T_s$ and $\lambda_t$ is the observed failure rate at some test temperature $T_t$.

The activation energy $E_{ac}$ for the used semiconductor technology can be derived from technology data or qualification testing.

Once the rate constant is determined, an accelerated aging, referred to as the virtual use or age, can be determined.

It is appreciated that other aging models can be used, including aging models based on non-temperature measurements, such as measurements of radioactive dose, supply voltage, voltage across critical devices, mechanical stress, oxygen, sunlight, vibration, humidity, pressure, electrostatic discharges, and the like.

Figure 2:
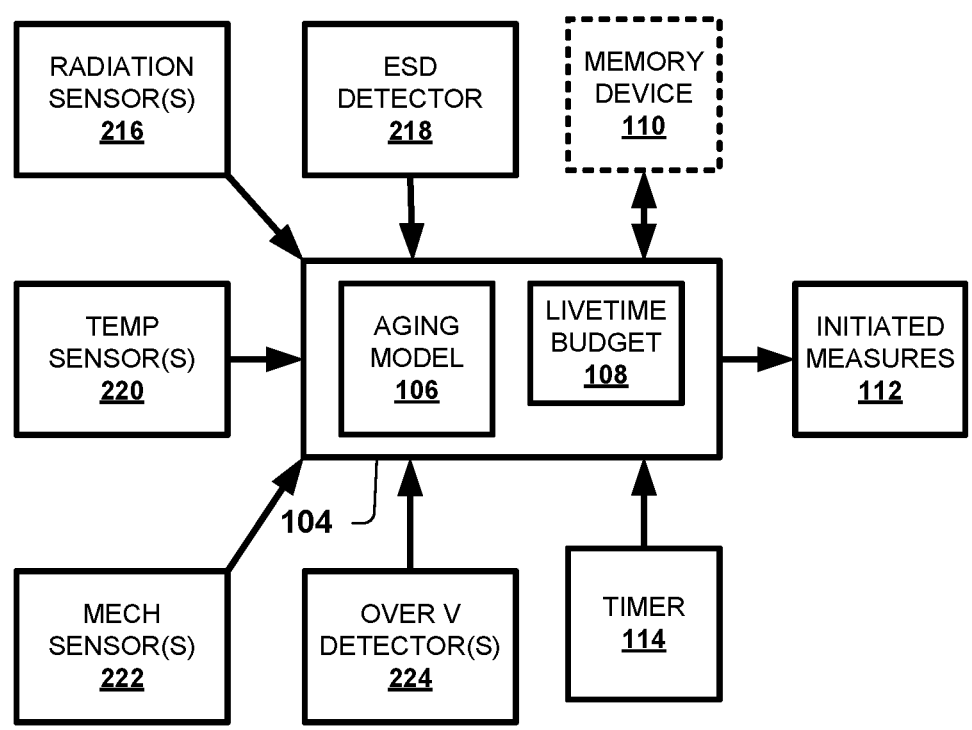
FIG. 2 is a block diagram of a virtual age monitoring system having detectors for multiple environmental properties.

FIG. 2 is a block diagram of a virtual age monitoring system 200 having detectors for multiple environmental properties. The system 200 can be utilized in automotive systems, vehicle systems, and the like and determines a virtual age for a main component. The system 200 can be fabricated into one or more devices and is part or within the main component.

The system 200 includes a livetime calculation component 104, a memory device 110, an initiated measured component 112 and a timer 114, which operate substantially as described above with regard to FIG. 1. The system 200 also includes multiple sensors including a radiation sensor 216, an ESD detector 218, a temperature sensor 220, a mechanic sensor 222 and an overvoltage detector 224. The sensors measure particular environmental properties, such as temperature, vibration, radiation, ESD, voltages, and the like. It is appreciated that variations of the system 200 are contemplated that omit one or more of the sensors and/or include other types/additional sensors. It is further appreciated that the sensors can be implemented with multiple sensor elements.

The radiation sensor 216 measures radiation particles and provides a particle measurement. The measurement can include a particle count or indicate a radiation level.

The ESD detector 218 identifies the occurrence of electrostatic discharges and provides a notification of the event. Such discharges can be damaging to ESD protection structures, supply voltages, circuitry, and the like within the main component. In one example, the detector 218 detects the activation of the protection device e.g. by monitoring a threshold of a current through the ESD protection circuitry or the presence of an electric field.

The temperature sensor 220 measures one or more temperatures at one or more locations of the main component. In one example, the sensor 220 generates the measurement as an analog value. The sensor 220 can include a thermocouple, thermistor, bipolar transistors and the like.

The mechanical sensor 222 measures a mechanical property, such as stress, vibration, angular position, rotations per minute, and the like. The mechanical sensor 222 provides mechanical measurements.

The overvoltage detector 224 measures or detects overvoltage conditions and provides a notification of the occurrence. Overvoltage conditions occur when a voltage exceeds a specified limit or range of voltages. For example, the overvoltage detector 224 may measure a voltage of 18V when there is a threshold voltage 12 V and indicate that an overvoltage was detected.

Additionally, the above sensors utilize an interface for communication and receiving power, such as a two line interface used in automotive electronics systems. However, it is appreciated that other suitable techniques of receiving power and communicating can be used.

The timer 114 provides one or more clocks that can be used for measuring time and/or operating time. The clocks can include an actual clock, an operating clock/time and the like. The operating time is also referred to as use time. The timer 114 can utilize components such as counters, resonators, and the like to generate the one or more clocks.

The memory device 110 is used to store device information for the main component. The device information includes, for example, operating life, environmental conditions, operating use, duration, virtual age and the like. Additionally, the device information can include sensor type specific information, including sensor measurements and time stamps, detected events (ESD and over voltages), and the like. Furthermore, the device information can be related to particular environmental properties, such as temperature or radiation. Thus, multiple virtual ages can exist, such as a virtual age based on temperature, a virtual based on radiation, and the like. Instead of a virtual age the livetime budget may also be given in form a a tolerable amount of detected events that is compared to an event counter.

The livetime calculation component 104 determines a livetime use time and/or the virtual age based on sensor measurements from the sensors and the one or more clocks from the timer 114. The livetime use can be sensor type specific, overall, or a combination of multiple sensor types. For example, the virtual age can be a first value based on temperature conditions and a second value based on ESD occurrences.

The calculation component 104 also determines a remaining livetime for the main component 106. This can be an overall remaining livetime considering all measurements from the sensors. Alternately, the remaining livetime can be environmental property specific.

The calculation component 104 uses an aging model 106 to convert a use time into a virtual use time per the environmental property. The use time includes an amount of time operated under measured conditions. The virtual use time includes an amount of virtual time operated under measured conditions. The virtual use time is collected by the calculation component 104 to determine an elapsed virtual use, which can be stored in the memory device 110. In one example, the calculation component 104 obtains a previous elapsed virtual use time from the memory device 110 and adds the virtual use time to the previous elapsed virtual use time to determine an updated elapsed virtual use.

The calculation component 104 also includes a livetime budget 108. This can be a static value or dynamically updated value. The livetime budget 108 includes or specifies a period of time at which the component should operate for given operating conditions, as specified in a mission profile. The calculation component 104 uses the livetime budget 108 to determine the remaining livetime. Thus, for example, the remaining livetime can be determined by subtracting the elapsed virtual use from the livetime budget 108. Similarly, the remaining livetime can be determined for particular environmental properties.

The livetime budget 108 can be determined using one or more suitable techniques. In one example, the livetime budget 108 is determined during design of the main component. In another example, the livetime budget 108 is determined by qualifying prototypes of the main component.

The calculation component 104 uses the memory device 110 to store and retrieve values main component information including, but not limited to, the livetime budget 108, the livetime use, the virtual age, the remaining livetime, the use time, the virtual use time, the elapsed virtual use time, the previous elapsed virtual use time, and the like. The component 104 can use the memory device 110 via an interface or other suitable connection.

The calculation component 104 signals the initiated measures component 112 to trigger an event in response to main component information. The triggers can include exceeding the remaining livetime, measured environmental parameters that exceed a range or the mission profile, events, fault or expected fault conditions, and the like. A fault is typically an unexpected event or effect that may be the result of overaging. Faults can be avoided by determining the livetime budget and/or virtual age prior to the budget being reached or exceeded.

The initiated measures component 112 causes the triggered events to occur in response to the signals from the calculation component. The events include, for example, reporting out information, shutting down the main component, reporting out fault conditions, reporting out parameters that exceed the mission profile, virtual ages, and the like.

Figure 3:
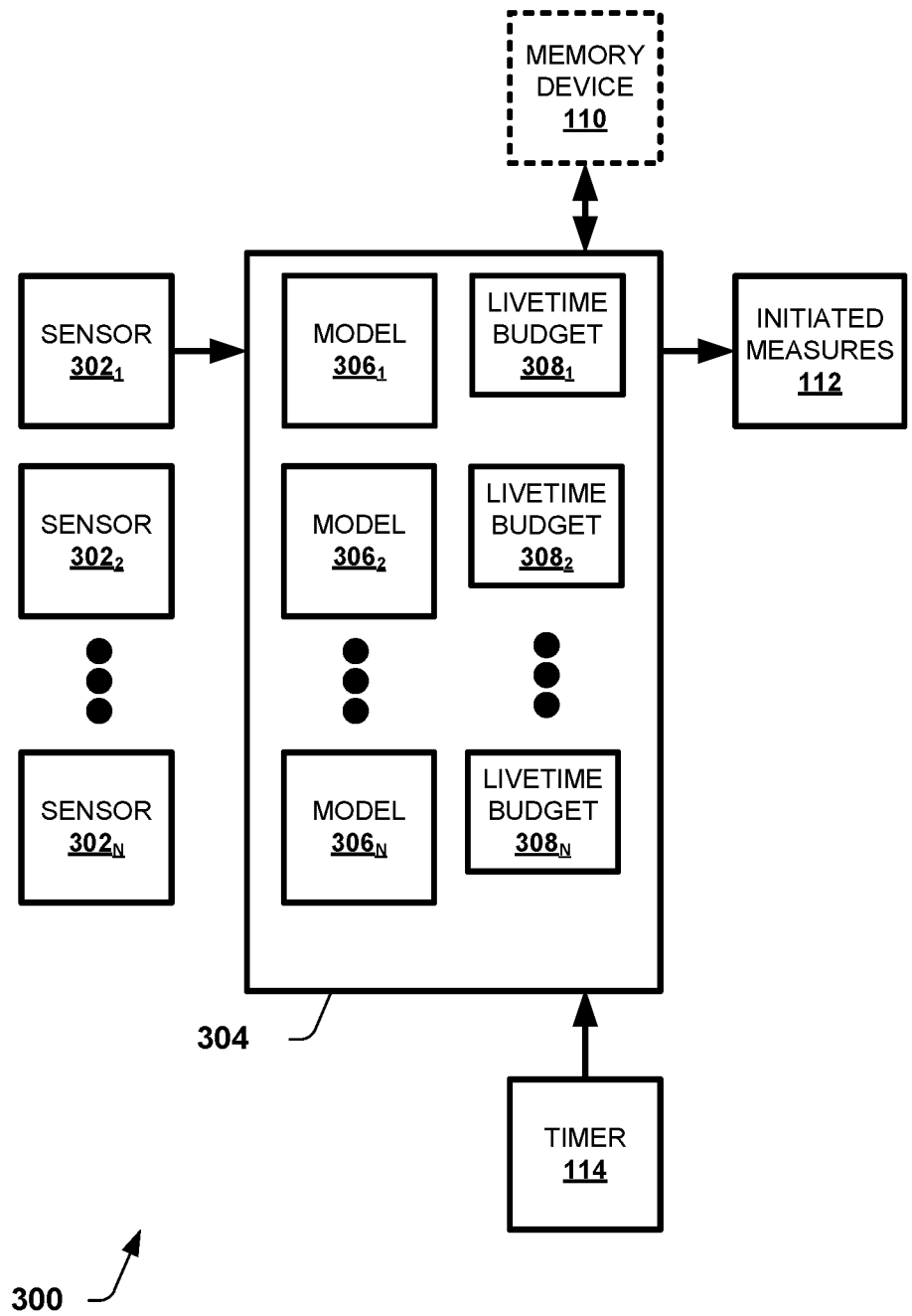
FIG. 3 is a block diagram of a virtual age monitoring system for multiple environmental properties using multiple aging models.

FIG. 3 is a block diagram of a virtual age monitoring system 300 for multiple environmental properties using multiple aging models and multiple age budgets. The system 300 can be utilized in automotive systems, vehicle systems, and the like and determines a virtual age for a main component. The system 300 can be fabricated into one or more devices and is part or within the main component.

The system 300 includes a livetime calculation component 304, a memory device 110, an initiated measured component 112 and a timer 114. The system 300 also includes a plurality of sensors $302_1$, $302_2$, . . . $302_N$, collectively referred to as 302.

The sensors 302 measure a plurality of environmental properties and/or detect occurrences. The properties include, for example, temperature, voltage, current, radiation, pressure, vibration, motion, rotation, static charge, and the like. The sensor measurements are provided to the livetime calculation component 304.

Additionally, the sensors 302 utilize an interface for communication and receiving power, such as a two line interface used in automotive electronics systems. However, it is appreciated that other suitable techniques of receiving power and communicating can be used.

The timer 114 provides one or more clocks that can be used for measuring time and/or operating time. The clocks can include an actual clock, an operating clock/time and the like. The operating time is also referred to as use time. The timer 114 can utilize components such as counters, resonators, and the like to generate the one or more clocks.

The memory device 110 is used to store device information for the main component associated with the system 300. The device information includes, for example, operating life, environmental conditions, operating use, duration, virtual age and the like. Additionally, the device information can include sensor type specific information, including sensor measurements and time stamps, detected events (ESD and over voltages), and the like. Furthermore, the device information can be related to particular environmental properties and particular sensors of the sensors 302. The environmental properties can include, for example, temperature, pressure, radiation and the like. Generally, there is a sensor foe each property to be measured.

Additionally, multiple virtual ages can be stored, such as a virtual age based on temperature, a virtual based on radiation, and the like.

The livetime calculation component 304 includes a plurality of aging models 306 and a plurality of livetime budgets 308. The livetime calculation component 104 determines a livetime use time and/or virtual ages based on measured properties from the sensors 302, the aging models 306 and the one or more clocks from the timer 114. In this example, there is a sensor, aging model, and livetime budget for each environmental property that is measured, such as temperature. However, it is appreciated that other variations are contemplated.

The aging models 306 are typically specific to environmental properties. For example, different aging models can be used for temperature aging, radiation aging, stress aging, overvoltage aging, ESD aging, aging of a mechanical MEMS structure (e.g. pressure sensors or accelerometers) and the like. Furthermore different aging models may be applied to different components that are used on the monitored electronic devide like high intergration digital transistors, high voltage DMOS transistors, bipolar transistors, ESD devices, Hall sensors, magnetoresistive sensors or MEMS sensors.

The calculation component 304 also determines a plurality of remaining livetimes for the main component based on the virtual ages and the livetime budgets 308. Each remaining livetime is generally based on a measured property, aging model, and livetime budget for a related environmental property.

The calculation component 104 signals the initiated measures component 112 to trigger an event in response to main component information. The triggers can include exceeding one of the remaining livetimes, measured environmental parameters that exceed a range or the mission profile, fault or expected fault conditions, and the like.

The initiated measures component 112 causes the triggered events to occur in response to the signals from the calculation component. The events include, for example, reporting out information, shutting down the main component, reporting out fault conditions, reporting out parameters that exceed the mission profile, virtual ages, and the like.

Figure 4:
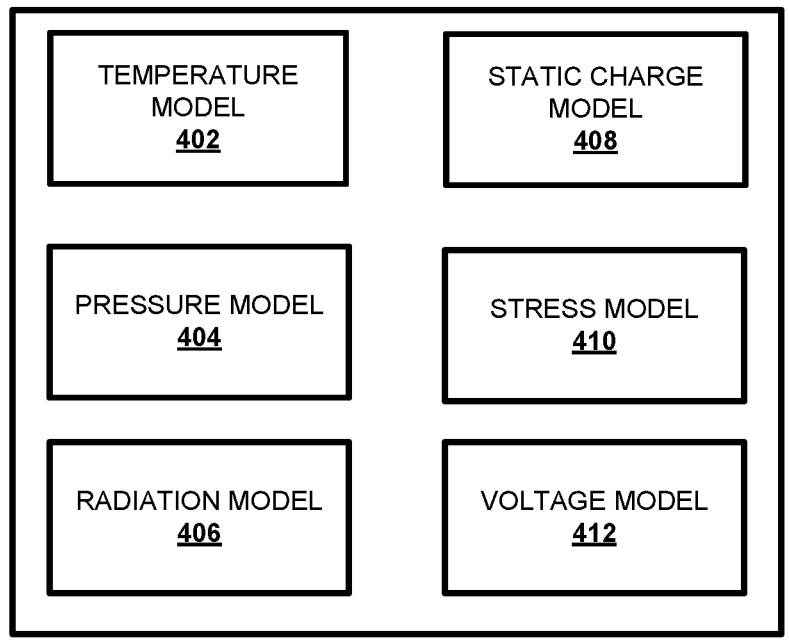
FIG. 4 is a block diagram illustrating example aging models.

FIG. 4 is a block diagram illustrating example aging models. The examples are provided for illustrative purposes and can be used with the above systems, 100, 200 and 300.

An aging model 306 is shown having a plurality of models as shown. The aging model 306 is configured to receive one or more measured properties. These measured properties are provided by sensors (not shown). The aging model 306 uses the measured properties to determine a virtual age.

The aging model 306, in this example, includes a temperature model 402, a pressure model 404, a radiation model 406, a static charge model 408, a mechanical stress model 410 and a voltage model 412. Generally, each model is used to determine or calculate accelerated aging based on an associated measured property.

The temperature model 402 determines a temperature based virtual age based on a measured temperature. An example of a suitable model is described above.

The pressure model 404 determines a pressure based virtual age based on a measured pressure. Typically, the higher the pressure the more accelerated the aging.

The radiation model 406 determines a radiation based virtual age based on a measured radiation. Some devices, such as random access memory (RAM), CMOS, and the like, are influenced by radiation.

The static charge model 408 determines a static charge or ESD age based on measured static charge or ESD events. Most devices are susceptible to the large voltages produced by static charge.

The mechanical stress model 410 determines a stress virtual age based on measured mechanical stress properties. Generally, increased stress accelerates aging. The voltage stress model 412 determines a voltage virtual age based on measured voltage properties. Increased voltages can lead to accelerated aging.

Especially the mechanical measurements of stress and pressure or measurements of a humidity may also be used to model aging effects of the package of a semiconductor IC.

The above models are provided for illustrative purposes and it is appreciated that other models and variations thereof can be utilized.

Figure 5:
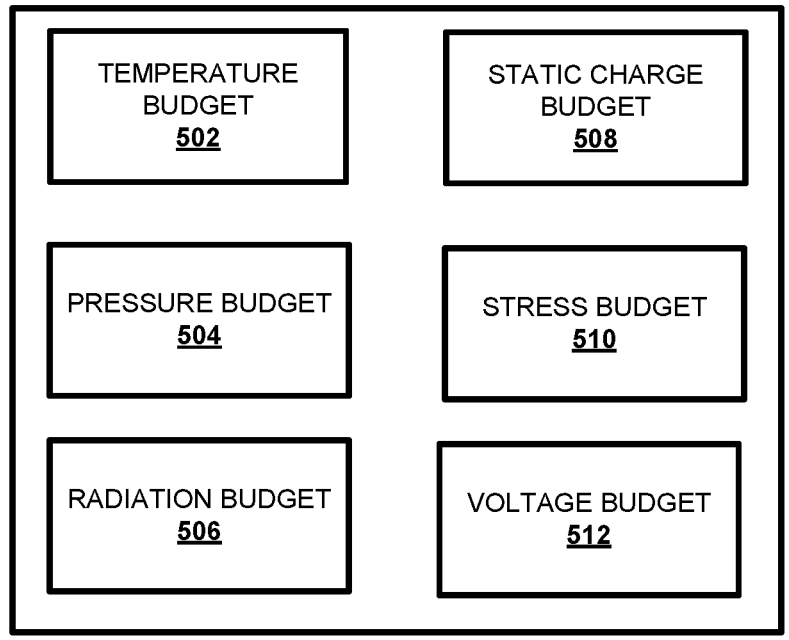
FIG. 5 is a block diagram illustrating examples of livetime budgets.

FIG. 5 is a block diagram illustrating examples of livetime budgets. The examples are provided for illustrative purposes and can be used with the above systems 100, 200 and 300.

A livetime budget 308 is shown having a plurality of individual budgets. The individual budgets can be referenced to determine a remaining livetime for a property or a measured property. The budget 308 includes a temperature budget 502, a pressure budget 504, a radiation budget 506, a static charge budget 508, a mechanical stress budget 510 and a voltage stress budget 512.

These budgets can be part of a mission profile for a component or device. Additionally, exceeding one or more of the budgets can indicate a fault condition and/or likely failure of the device. Furthermore multiple instances of a certain budget may exist for different kind of devices that are used on the main device.

The above budgets are provided for illustrative purposes and it is appreciated that other models and variations thereof can be utilized.

Figure 6:
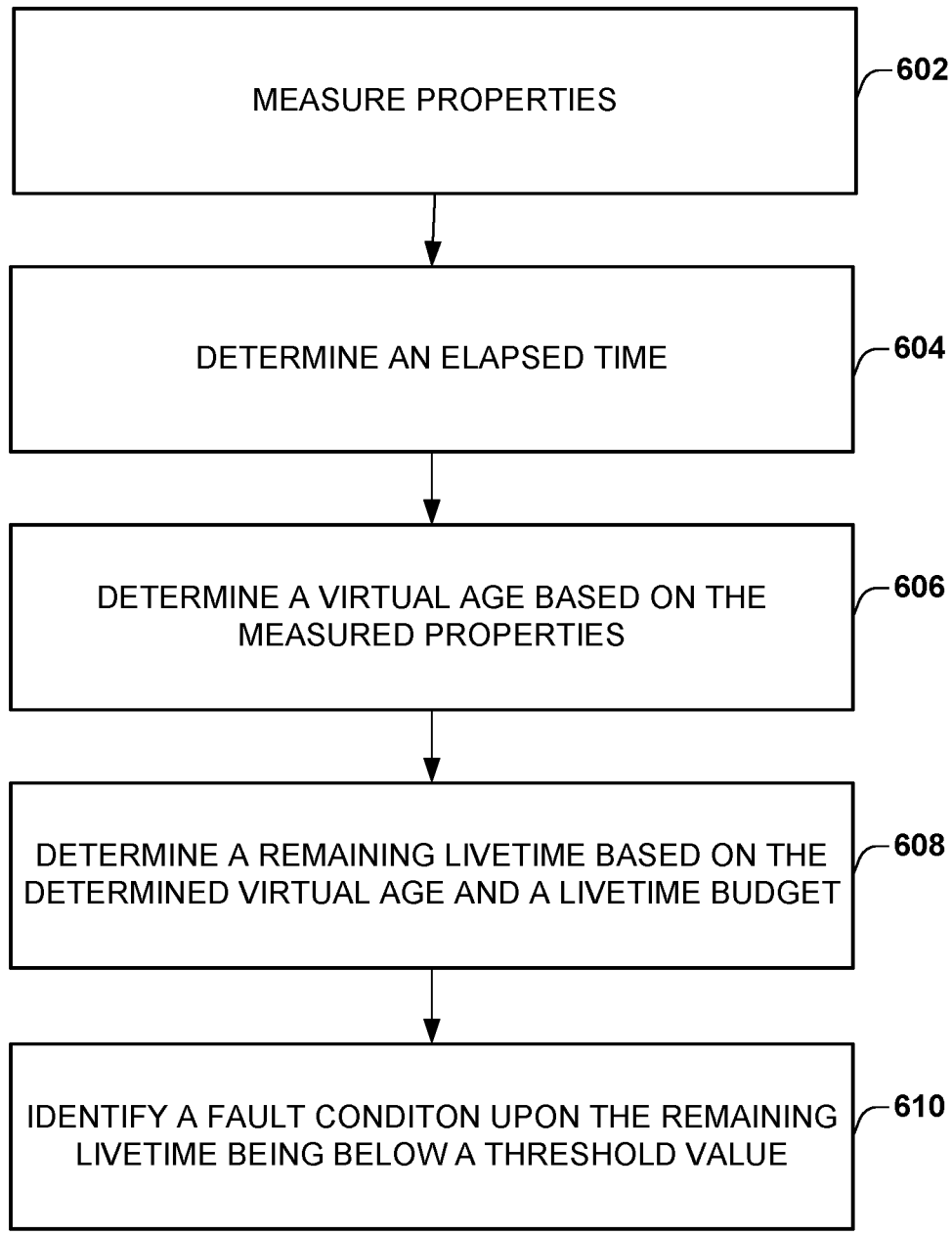
FIG. 6 is a flow diagram illustrating a method of identifying age based fault conditions.

FIG. 6 is a flow diagram illustrating a method 600 of identifying age based fault conditions. The method 600 using an aging model and livetime budget to determine a virtual age and related events including fault conditions for a main component. The main component includes a device or technology part, such as digital complimentary metal-oxide semiconductor (CMOS), analog CMOS, sensors, bipolar sensors, flash components, and the like.

The method 600 begins at block 602, wherein one or more environmental properties are measured. The properties include temperature, pressure, radiation, static charge, mechanical stress, voltage stress, and the like.

An elapsed time or duration for the measured properties is determined at block 604. A clock or other time tracking mechanism can be used.

A virtual age is determined based on the measured properties at block 606. The virtual age can include a plurality of individual ages associated with varied properties. The virtual age is determined using the measured properties and the elapsed time with an aging model, such as described above.

For the case that devices show accelerated aging or varied aging due to different effects the livetime budgeting can be done independently for each aging effect or cumulatively for several effects.

A remaining livetime is determined from the virtual age and a livetime budget at block 608. The remaining livetime, in one example, is the virtual age subtracted from the livetime budget. As shown above, the livetime budget can include individual budgets based on varied properties. Furthermore, the remaining livetime can also include individual livetimes based on the varied properties.

A fault condition is identified upon the remaining livetime being below a threshold value at block 610. In one example, the threshold value is about zero and the fault condition occurs essentially on the livetime budget being zero. In another example, the threshold value is a positive value and the fault condition indicates that the livetime budget is close to being exceeded. In yet another example, an event or fault is be identified on the remaining budget being below a threshold value or limit. The limit selected to prevent a fault or fauler of the main component from occurring.

While the method and variations thereof are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems/devices shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

An age monitoring arrangement includes a sensor, a calculation component, and a timer. The sensor is configured to generate one or more measurements of an environmental property. The calculation component is configured to generate a virtual age and identify an occurrence of a fault based on the one or more measurements and a clock using an aging module. The timer is configured to generate the clock.

Another age monitoring arrangement is disclosed. The arrangement includes a first sensor, a second sensor, and a calculation component. The first sensor is configured to generate one or more first measurements of a first property. The second sensor is configured to generate one or more second measurements of a second property. The calculation component is configured to identify one or more faults based on the one or more first measurements, the one or more second measurements, and an aging model.

A method of monitoring a component is disclosed. A property is measured. An elapsed or use time is determined. A virtual age is determined based on the measured first property and the elapsed time using an aging model. A remaining livetime is determined according to the virtual age and the livetime budget.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An age monitoring arrangement for monitoring an age of a device, the age monitoring arrangement comprising:
    a first sensor configured to generate one or more first measurements of a first property of an environment of the device;
    a second sensor configured to generate one or more second measurements of a second property of the environment of the device; and
    a calculation circuitry configured to generate a standard time from a clock and a use time of the device from the clock, to determine a virtual use time of the device based on the standard time, the use time, the one or more first measurements, and the one or more second measurements, and to identify one or more events based on the virtual use time, the one or more first measurements, the one or more second measurements, and one or more aging models.

2. The arrangement of claim 1, wherein the calculation circuitry is further configured to identify the one or more events based on a livetime budget.

3. The arrangement of claim 1, wherein at least a portion of the one or more aging models are based on the first property and the calculation circuitry includes a second aging model based on the second property, wherein the calculation circuitry is configured to generate a second virtual use time based on the one or more second measurements and the second aging model.

4. The arrangement of claim 1, further comprising a third sensor configured to generate one or more third measurements of a third property of the environment of the device.

5. The arrangement of claim 1, wherein the first property is different than the second property.

6. The arrangement of claim 1, wherein the first property is selected from a group comprising temperature, magnetic field, electrostatic discharge (ESD) and electromagnetic interference (EMI).

7. The arrangement of claim 1, wherein the calculation circuitry is configured to identify occurrence of a trigger based on the one or more first measurements and the one or more second measurements.

8. The arrangement of claim 7, wherein the calculation circuitry is configured to cause a triggered action to occur in response to the identified trigger.

9. The arrangement of claim 1, further comprising an initiated measures circuitry configured to cause one or more triggered actions to occur in response to the identified one or more events.

10. The arrangement of claim 1, wherein the calculation circuitry is configured to select a first model and a first livetime budget based on the first property and select a second model and a second livetime budget based on the second property, wherein the second property is different than the first property.

11. The arrangement of claim 1, wherein the calculation circuitry is configured to generate a first virtual age based on a first aging model and the one or more first measurements and generate a second virtual age based on a second aging model and the one or more second measurements.

12. An age monitoring arrangement for monitoring an age of a component, the age monitoring arrangement comprising:
- a plurality of sensors configured to generate one or more measurements for a plurality of properties of an environment of the component;
- a plurality of aging models, wherein the plurality of aging models are each associated with a selected property of the plurality of properties of the environment of the component;
- a plurality of livetime budgets, wherein the plurality of livetime budgets are each associated with the selected property of the plurality of properties of the environment of the component, and wherein each livetime budget of the plurality of livetime budgets is different from one another; and
- a calculation circuitry comprising a memory storing instructions and at least one hardware processor to execute instructions to generate a plurality of virtual ages for the plurality of properties of the environment of the component based on the generated one or more measurements.

13. The arrangement of claim 12, wherein the at least one hardware processor further executes instructions to determine a plurality of remaining livetime based on the plurality of virtual ages and the plurality of livetime budgets, and wherein the plurality of livetime budgets are dynamically updated.

14. The arrangement of claim 12, wherein the at least one hardware processor further executes instructions to generate an occurrence of a trigger based on the generated one or more measurements.

15. The arrangement of claim 14, wherein the at least one hardware processor further executes instructions to cause a triggered action to occur in response to the occurrence of the trigger.

16. A method of monitoring a component, the method comprising:
- measuring a first property of an environment of the component with a first sensor;
- measuring a second property of the environment of the component with a second sensor;
- determining elapsed time of operation of the component with a timer;
- determining, with a processor, a virtual age of the component based on the measured first property, the measured second property, and the elapsed time of operation using an aging model; and
- determining, with the processor, a remaining livetime of the component based on the determined virtual age and a livetime budget of the component.

17. The method of claim 16, further comprising identifying an end of life condition on the remaining livetime being below a threshold value.

18. The method of claim 16, further comprising determining a fault condition based on the remaining livetime and causing an action to occur in response to the fault condition.

* * * * *